Patented Sept. 28, 1948

2,450,134

UNITED STATES PATENT OFFICE 2,450,134

PREPARATION OF β-LACTONES

Hugh J. Hagemeyer, Jr., Kingsport, Tenn., assignor to Eastman Kodak Company, Rochester, N. Y., a corporation of New Jersey No Drawing. Application September 10, 1947, Serial No. 773,293

17 Claims. (Cl. 260—344)

This invention relates to a process for preparing lactones of β-hydroxy carboxylic acids. More specifically this invention relates to a process for preparing lactones of β-hydroxy carboxylic acids which comprises reacting a ketene with a carbonyl-containing compound such as an aldehyde, ketone, diketone, or ketoester.

Staudinger first showed that a keto ketene, such as diphenyl ketene, added to aldehydes or ketones to give β-lactones. Ann. 384, 38–135 (1911), and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With alehydes, the ketene dimers react to form unsaturated ketones. See Boese, United States Patent 2,108,427, dated February 15, 1938.

Kung in United States Patent 2,356,459, dated August 22, 1944, has shown that ketene $$(CH_2=C=O)$$

reacts with aldehydes or ketones to give β-lactones, in the presence of Friedel-Crafts type of catalysts.

I have now found that β-lactones may be prepared by reacting a ketene with an aldehyde, ketone, diketone, or ketoester, hereinafter referred to as carbonyl-containing compounds, in the presence of a mercuric halide as catalyst. The mercuric halides which I employ as catalysts are not considered to be Friedel-Crafts type catalysts as are the catalysts of the prior art as exemplified by the Kung patent noted above. The present catalysts are much milder than those of the prior art and permit the utilization of a greater number and variety of carbonyl-containing compounds than has heretofore been possible. Undesirable carbonylic condensation and catalyst complexes are largely or entirely avoided. The separation of a purer product without difficulty is thus made possible by the present invention.

It is, therefore, an object of this invention to provide a process for preparing β-lactones.

A further object of this invention is to provide new catalysts for the condensation of a ketene and a carbonyl-containing compound. Other objects will become apparent from a consideration of the following description.

The ketenes which are advantageously employed in practicing my invention can be represented by the following general formula

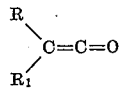

wherein R and $R_1$ each represents a hydrogen atom, an alkyl group (i. e. especially methyl and ethyl groups, i. e. alkyl groups of the formula $C_nH_{2n+1}$ wherein $n$ represents a positive integer of from 1 to 2) or an aryl group (especially a phenyl group, i. e. a $C_6H_5$— group). Although my invention is directed primarily to a process involving ketene ($CH_2=C=O$), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The aldehydes which are advantageously employed in practicing my invention can be represented by the following general formula:

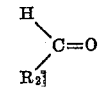

wherein $R_2$ represents hydrogen, an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein $R_2$ represents a hydrogen atom or a methyl group.

The ketones which are advantageously employed in practicing my invention can be represented by the following general formula:

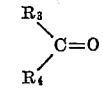

wherein $R_3$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and β-phenylethyl), and $R_4$ represents an alkyl group (especially methyl and ethyl groups) an aryl group (especially a monocyclic aryl group of the benzene series, e. g. phenyl, m-tolyl and p-tolyl) or an aralkyl group (especially benzyl and β-phenylethyl). My new process is especially useful for the preparation of β-lactones from the above-formulated ketones wherein $R_4$ represents a methyl group.

The diketones which are advantageously employed in practicing my invention can be represented by the following general formula:

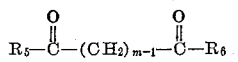

wherein $R_5$ and $R_6$ each represents an alkyl group (especially a methyl, an ethyl or a n-propyl group) and $m$ represents a positive integer of from 1 to 3.

The keto carboxylic esters which are advantageously employed in practicing my invention can be represented by the following general formula:

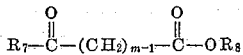

wherein $R_7$ represents an alkyl group (especially methyl and ethyl groups), $R_8$ represents an alkyl group (especially methyl, ethyl, isopropyl, n-propyl, n-butyl, isobutyl and secondary butyl groups) and $m$ represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione - 2,4, methyl pyruvate, ethyl pyruvate, methyl acetoacetate, ethyl acetoacetate, n-propyl acetoacetate, n-butyl acetoacetate, ethyl levulinate, etc.

The mercuric halide catalysts which I employ have the formula:

$$Hg(X)_2$$

wherein X is a member selected from the group consisting of chlorine (Cl) and bromine (Br). The amount of catalyst may be varied according to the type and reactivity of the carbonyl-containing compound used. Generally concentrations of catalyst from 0.1 to 3% by weight, based on the total weight of the reaction mixture, may be employed. These concentrations may be varied as desired; however, there is generally no advantage in doing so.

Where the carbonyl compound employed is an aldehyde, it is advantageous ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously my new process is carried out in a solvent for the reactants, i. e. an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, etc.

In the case of the lower aldehydes, such as formaldehyde and acetaldehyde, ketenes which are liquid at 10° C. can be employed as solvents because formaldehyde and acetaldehyde react with the ketenes much faster than do the ketones to give β-lactones in accordance with my process. Acetone and methyl ethyl ketone are advantageously employed as solvents when formaldehyde or acetaldehyde is employed.

The β-lactones, themselves, are excellent solvents in which to carry out my new process and are the preferred solvents.

The temperature may likewise be varied according to the type of reactants being employed. The temperature may be as low as —50° C. or as high as +50° C. Generally, I prefer to use temperatures between 0° and 20° C.

The process of my invention can be carried out batchwise or continuously (e. g.) in the continuous manner described in the copending application of Hugh J. Hagemeyer, Jr., and Delmar C. Cooper, Serial No. 660,286, filed on April 6, 1946. Where ketene ($CH_2=C=O$) is prepared by the catalytic pyrolysis of acetic acid at reduced pressures, it is advantageous to carry out the process at reduced pressure in a scrubber-type reactor, e. g. ketene and formaldehyde can be reacted at reduced pressure in a scrubber-type reactor (in the manner described in the copending application of Herbert G. Stone, Serial No. 660,285, filed on April 6, 1946, using β-propionolactone as a solvent and boric acid as a catalyst).

Many of the β-lactones can be distilled from the reaction mixtures under reduced pressures. However, many of the β-lactones derived from aldehydes and ketones containing olefinic bonds (e. g. crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize and, or decarboxylate when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

If desired, the β-lactone need not be separated from the reaction mixture directly, but may be hydrolyzed to the hydroxy carboxylic acid which may subsequently be dehydrated to the unsaturated carboxylic acid according to the following equations:

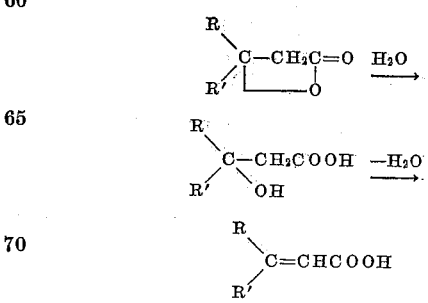

wherein R and R' each represents hydrogen or a hydrocarbon radical.

Alternatively, as a measure of the β-lactone produced, the reaction mixture may be distilled at atmospheric pressure thus causing the decarboxylation of the lactone to an unsaturated compound. This manner of procedure is particularly valuable when it is desired to prepare an unsaturated ketone from the lactone formed by reacting a ketene with a diketone or an unsaturated ester from the lactone formed by reacting a ketene with a ketoester.

The following examples will serve to illustrate further the manner of practicing my invention.

*Example I.—Lactone of β-hydroxypropionic acid (β-propionolactone)*

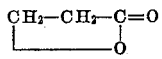

Gaseous ketene and formaldehyde are mixed in substantially equimolar ratios, and passed into a liter of acetone in which has been dissolved 5 gms. of mercuric chloride. While maintaining the temperature at 0°–10° C., ketene and formaldehyde are continuously passed into the solution until a total of 642 gms. of ketene and 475 gms. of formaldehyde have been added. The crude reaction mixture consisting essentially of the β-propionolactone is then flash distilled at 80° C. and 2 mm. pressure. Upon redistillation of the flashed material, 871 gms. of β-propionolactone boiling at 51° C. (10 mm.), $N_D^{20}$ 1.4130, is obtained (95% yield based on ketene consumed).

*Example II.—Lactone of β-hydroxybutyric acid (β-butyrolactone)*

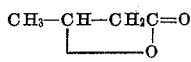

Mercuric chloride (1 gm.) is dissolved in acetone and gaseous ketene is passed into the stirred solution. Acetaldehyde is added at regular intervals throughout the run, and care is taken to avoid too high a concentration of aldehyde, it being preferred to have the aldehyde react with the ketene substantially as fast as it is added. During an 8 hr. period, a total of 88 gms. of ketene and 76 gms. of acetaldehyde are passed into the acetone solution. Distillation of the reaction mixture at 10 mm. gives 45 gms. of β-butyrolactone boiling at 54° C.

*Example III.—Lactone of β-hydroxypropionic acid. (β-propionolactone)*

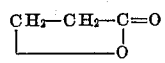

Mercuric chloride (50 gms.) is dissolved in 6 liters of methyl ethyl ketone and the solution changed to a scrubber maintained at reduced pressure which was equipped with a return line running from the top to the bottom of the scrubber. This line was jacketed and equipped for cooling by means of glycol circulated through the jacket. The ketone solution was circulated through the scrubber and cooled to 0° C. Gaseous ketene and formaldehyde were mixed immediately before entering the scrubber through a nozzle which was placed just below the screen supporting the Berl saddle packing of the reactor. The pressure on the line through which the ketene was added was maintained at 90 mm. while the pressure at the top of the reactor was 40 mm., and the temperature was constantly maintained at approximately 0° C. During a 12 hour period a total of 1730 gms. of formaldehyde and 2450 gms. of ketene were bled in. Upon distillation of a composite sample of the reaction mixture at 10 mm. pressure, a 52% yield of β-propionolactone boiling at 51° C., $N_D^{20}$ 1.4129, was obtained.

*Example IV.—Lactone of β-hydroxy-β-methylbutyric acid*

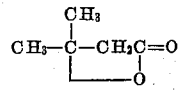

A stainless steel jacketed reactor, 8 feet high and 2 inches inside diameter, was charged with a solution of acetone containing 30 gms. of mercuric chloride. The solution was circulated through the reactor from bottom to top and thence to the bottom through a return line at the rate of 2.0 gallons per minute, the solution being cooled to 0° C. by means of cold glycol circulated through the jacket of the reactor. Ketene at a rate of 5.8 gms. per minute and acetone at a rate of 7.9 gms. per minute were mixed immediately before entering the scrubber by means of a nozzle placed just below the screen supporting the Berl saddle packing. As the volume of the reactor increased the liquid overflowed at the top, through a liquid-seal overflow into a line connected with a still. The uncondensed vapors from the still, along with recovered acetone were led back to the reactor, and a partially purified β-methyl-β-butyrolactone was obtained as a distillate. In a 24 hour run 10,080 gms. of ketene, 13,800 gms. of acetone, and 110 gms. of mercuric chloride were charged to the reactor. A one liter composite sample was flash distilled at 80° C. and 2 mm. pressure, and upon redistillation of the fraction then attained a 68% yield of β-methyl-β-butyrolactone boiling at 55° C. under 10 mm. pressure was obtained. Titration of an aliquot portion of the lactone with standard caustic gave an equivalent weight of 99. (Theoretical=100.)

*Example V.—Lactone of β-hydroxy-β-carboethoxymethylbutyric acid*

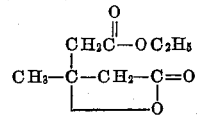

2 gms. of mercuric bromide were dissolved in 500 gms. of ethyl acetoacetate at 0° C. Gaseous ketene was then passed in through a high-speed stirrer at the rate of 0.43 mole per hour for an eight hour period. The reaction mixture consisted essentially of the lactone of β-hydroxy-β-carboethoxymethylbutyric acid. The lactone was decarboxylated by refluxing at atmospheric pressure, the temperature of decomposition being 90–110° C. A 304 gm. yield of the ethyl ester of isopropenylacetic acid, B. P. 54.5° C./20 mm., was obtained. This ester was reduced with Raney nickel at 80° C. to give a quantitative yield of ethyl isovalerate.

*Example VI.—Lactone of β-hydroxy-β-acetylmethylbutyric acid*

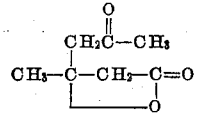

1.5 gms. of mercuric bromide were dissolved in 300 cc. of acetylacetone, and ketene was passed in through a high-speed stirrer, while the temperature of the solution was maintained at 5–10° C. The reaction mixture consisted largely of the lactone of β-hydroxy-β-acetylmethylbutyric acid. The lactone was identified by decarboxylating at 90–110° C., a vigorous evolution of carbon dioxide taking place. After one hour under total reflux, diisopropenyl methane, B. P. 88° C./735 mm., and 2-methylpenten-1-one-4, B. P. 127° C./735 mm. were obtained on fractionation of the reaction mixture.

Other β-lactones may likewise be prepared according to my process. For example, if butyraldehyde replaces the formaldehyde of Example I, β-caprolactone having the formula:

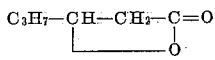

is obtained in excellent yield. In like manner when dimethyl ketene replaces the ketene of Example I a lactone having the formula:

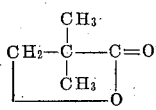

is obtained. When 1 mol of ketene reacts with 1 mol of acetophenone in the presence of mercuric bromide, a lactone having the formula:

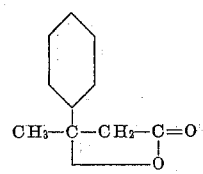

is obtained in 70–75% yield. When propionyl acetone replaces the acetyl acetone of Example VI, a lactone having the formula:

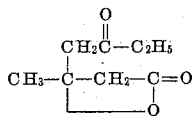

is produced. When diphenyl ketene replaces the ketene of Example II, a lactone having the formula:

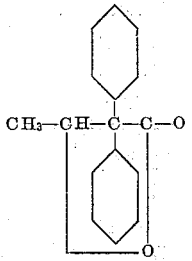

is produced. Heterocyclic and unsaturated carbonyl-containing compounds may be used to prepare β-lactones according to the process described above. Furfural, for example, produces the lactone:

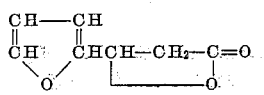

when treated with ketene in the presence of mercuric chloride, while crotonaldehyde gives the lactone:

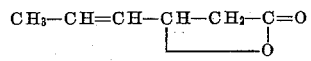

in excellent yield.

The lactones produced according to the above-described process are useful in the preparation of synthetic resins, polymers, and rubbers. They are also valuable intermediates in the preparation of unsaturated acids, esters, amides, and nitriles.

I claim:

1. A process for making beta-lactones which comprises reacting at a temperature of from −50° C. to +50° C. a ketene having the formula:

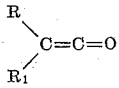

wherein R and $R_1$ each represents a member selected from the group consisting of a hydrogen atom, a methyl group, an ethyl group and a phenyl ($C_6H_5$—) group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group, ketones having the formula:

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5$—) group, diketones having the formula:

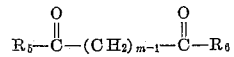

and ketoesters having the formula:

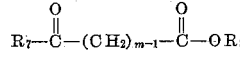

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.1–3% by weight, based on the total weight of the reaction mixture of a catalyst having the formula:

$$Hg(X)_2$$

wherein X represents a member selected from the group consisting of a chlorine atom and a bromine atom.

2. A process for making beta-lactones which comprises reacting at a temperature of from −50° C. to +50° C. a ketene having the formula:

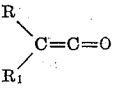

wherein R and $R_1$ each represents a member selected from the group consisting of a hydrogen atom, a methyl group, an ethyl group and a phenyl ($C_6H_5$—) group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group, ketones having the formula:

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5-$) group, diketones having the formula:

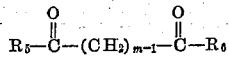

and ketoesters having the formula:

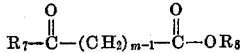

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.1-3% by weight, based on the total weight of the reaction mixture of a catalyst having the formula:

$$Hg(X)_2$$

wherein X represents a member selected from the group consisting of a chlorine atom and a bromine atom, and in the presence of a solvent selected from the group consisting of diethyl ether, diisopropyl ether, dioxane, chloroform, ethylene dichloride, carbon tetrachloride and a beta-lactone corresponding to the lactone being formed in the reaction.

3. A process for making beta-lactones which comprises reacting at a temperature of from $-50°$ C. to $+50°$ C. a ketene having the formula:

wherein R and $R_1$ each represents a member selected from the group consisting of a hydrogen atom, a methyl group, an ethyl group and a phenyl ($C_6H_5-$) group with a carbonyl-containing compound selected from the group consisting of aldehydes having the formula:

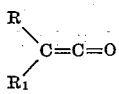

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group, ketones having the formula:

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5-$) group, diketones having the formula:

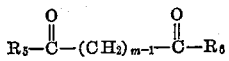

and ketoesters having the formula:

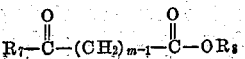

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.13-3% by weight, based on the total weight of the reaction mixture of a catalyst having the formula:

$$Hg(X)_2$$

wherein X represents a member selected from the group consisting of a chlorine atom and a bromine atom, and in the presence of a beta-lactone corresponding to the lactone being formed in the reaction.

4. A process for making a beta-lactone which comprises reacting at a temperature of from $-50°$ C. to $+50°$ C. ketene ($CH_2=C=O$) with a carbonyl compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group, ketones having the formula:

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5-$) group, diketones having the formula:

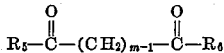

and ketoesters having the formula:

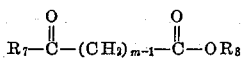

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.1-3% by weight, based on the total weight of the reaction mixture of a catalyst having the formula:

$$Hg(X)_2$$

wherein X represents a member selected from the group consisting of a chlorine atom and a bromine atom.

5. A process for making a beta-lactone which comprises reacting at a temperature of from $-50°$ C. to $+50°$ C. ketene ($CH_2=C=O$) with a carbonyl compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl (C₆H₅–) group, ketones having the formula:

wherein R₃ and R₄ each represents a member selected from the group consisting of alkyl groups having the formula $C_nH_{2n+1}$ wherein $n$ is a positive integer from 1 to 4, a benzyl group, a beta-phenyl ethyl group and a phenyl (C₆H₅–) group, diketones having the formula:

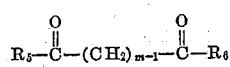

and ketoesters having the formula:

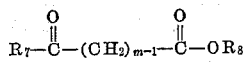

wherein R₅, R₆, R₇ and R₈ each represents an alkyl group having the formula $C_nH_{2n+1}$ wherein $n$ is a positive integer from 1 to 4, and $m$ represents a positive integer from 1 to 3, in the presence of from 0.1-3% by weight, based on the total weight of the reaction mixture of a catalyst having the formula:

$$Hg(X)_2$$

wherein X represents a member selected from the group consisting of a chlorine atom and a bromine atom and in the presence of a solvent selected from the group consisting of diethyl ether, diisopropyl ether, dioxane, chloroform, ethylene dichloride, carbon tetrachloride and a beta-lactone which corresponds to the lactone being formed in the reaction.

6. A process for making a beta-lactone which comprises reacting at a temperature of from −50° C. to +50° C. ketene (CH₂=C=O) with a carbonyl compound selected from the group consisting of aldehydes having the formula:

wherein R₂ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl (C₆H₅–) group, ketones having the formula:

wherein R₃ and R₄ each represents a member selected from the group consisting of alkyl groups having the formula $C_nH_{2n+1}$ wherein $n$ is a positive integer from 1 to 4, a benzyl group, a beta-phenyl ethyl group and a phenyl (C₆H₅–) group, diketones having the formula:

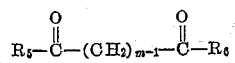

and ketoesters having the formula:

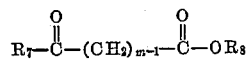

wherein R₅, R₆, R₇ and R₈ each represents an alkyl group having the formula $C_nH_{2n+1}$ wherein $n$ is a positive integer from 1 to 4, and $m$ represents a positive integer from 1 to 3, in the presence of from 0.1-3% by weight, based on the total weight of the reaction mixture of a catalyst having the formula:

$$Hg(X)_2$$

wherein X represents a member selected from the group consisting of a chlorine atom and a bromine atom and in the presence of a beta-lactone which corresponds to the lactone being formed in the reaction.

7. A process for making a beta-lactone which comprises reacting at a temperature of from −50° C. to +50° C. ketene (CH₂=C=O) with a carbonyl compound selected from the group consisting of aldehydes having the formula:

wherein R₂ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl (C₆H₅—) group, ketones having the formula:

wherein R₃ and R₄ each represents a member selected from the group consisting of alkyl groups having the formula $C_nH_{2n+1}$ wherein $n$ is a positive integer from 1 to 4, a benzyl group, a beta-phenyl ethyl group and a phenyl (C₆H₅—) group, diketones having the formula:

and ketoesters having the formula:

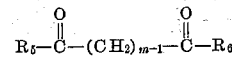

wherein R₅, R₆, R₇ and R₈ each represents an alkyl group having the formula $C_nH_{2n+1}$ wherein $n$ is a positive integer from 1 to 4, and $m$ represents a positive integer from 1 to 3, in the presence of from 0.1-3% by weight, based on the total weight of the reaction mixture, of mercuric chloride.

8. A process for making a beta-lactone which comprises reacting at a temperature of from −50° C. to +50° C. ketene (CH₂=C=O) with a carbonyl compound selected from the group consisting of aldehydes having the formula:

wherein R₂ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl (C₆H₅—) group, ketones having the formula:

wherein R₃ and R₄ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5$—) group, diketones having the formula:

$$R_5-\overset{O}{\underset{\|}{C}}-(CH_2)_{m-1}-\overset{O}{\underset{\|}{C}}-R_6$$

and ketoesters having the formula:

$$R_7-\overset{O}{\underset{\|}{C}}-(CH_2)_{m-1}-\overset{O}{\underset{\|}{C}}-OR_8$$

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.1%–3% by weight, based on the total weight of the reaction mixture, of mercuric bromide.

9. A process for making a beta-lactone which comprises reacting at a temperature of from —50° C. to +50° C. a ketene having the formula:

$$\underset{R_1}{\overset{R}{\diagdown}}C=C=O$$

wherein R and $R_1$ each represents a member selected from the group consisting of a hydrogen atom, a methyl group, an ethyl group and a phenyl ($C_6H_5$—) group with an aldehyde represented by the formula:

$$\underset{R_2}{\overset{H}{\diagdown}}C=O$$

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group in the presence of from 0.1%–3% by weight, based on the total weight of the reaction mixture, of a catalyst having the formula:

$$Hg(X)_2$$

wherein X represents a member selected from the group consisting of a chlorine atom and a bromine atom.

10. A process for making a beta-lactone which comprises reacting at a temperature of from —50° C. to +50° C. ketene ($CH_2=C=O$) with an aldehyde represented by the formula:

$$\underset{R_2}{\overset{H}{\diagdown}}C=O$$

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group in the presence of from 0.1%–3% by weight, based on the total weight of the reaction mixture, of a catalyst having the formula:

$$Hg(X)_2$$

wherein X represents a member selected from the group consisting of a chlorine atom and a bromine atom.

11. A process for making a beta-lactone which comprises reacting at a temperature of from —50° C. to +50° C. ketene ($CH_2=C=O$) with an aldehyde represented by the formula:

$$\underset{R_2}{\overset{H}{\diagdown}}C=O$$

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group in the presence of from 0.1%–3% by weight, based on the total weight of the reaction mixture, of mercuric chloride.

12. A process for making a beta-lactone which comprises reacting at a temperature of from —50° C. to +50° C. ketene ($CH_2=C=O$) with an aldehyde represented by the formula:

$$\underset{R_2}{\overset{H}{\diagdown}}C=O$$

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group in the presence of from 0.1%–3% by weight, based on the total weight of the reaction mixture, of mercuric bromide.

13. A process for preparing beta-propionolactone which comprises reacting ketene with formaldehyde at a temperature of —50° to +50° C. in the presence of from 0.1%–3% by weight, based on the total weight of the reaction mixture, of a catalyst having the formula:

$$Hg(X)_2$$

wherein X represents a member selected from the group consisting of a chlorine atom and a bromine atom.

14. A process for preparing beta-propionolactone which comprises reacting ketene with formaldehyde at a temperature of —50° to +50° C. in the presence of a solvent, selected from the group consisting of beta-propionolactone, diethyl ether, diisopropyl ether, dioxane, chloroform, ethylene dichloride, and carbon tetrachloride, and 0.1%–3% by weight, based on the total weight of the reaction mixture, of catalyst having the formula;

$$Hg(X)_2$$

wherein X represents a member selected from the group consisting of a chlorine atom and a bromine atom.

15. A process for preparing beta-propionolactone which comprises reacting ketene with formaldehyde at a temperature of —50° to +50° C. in the presence of a beta-propionolactone as a solvent and in the presence of from 0.1%–3% by weight, based on the total weight of the reaction mixture, of mercuric chloride.

16. A process for preparing beta-propionolactone which comprises reacting ketene with formaldehyde at a temperature of —50° to +50° C. in the presence of from 0.1%–3% by weight, based on the total weight of the reaction mixture, of mercuric bromide.

17. A process for preparing beta-butyrolactone which comprises reacting ketene with acetaldehyde at a temperature of —50° to +50° C. in the presence of from 0.1%–3% by weight, based on the total weight of the reaction mixture, of mercuric chloride.

HUGH J. HAGEMEYER, Jr.

No references cited.

Certificate of Correction

Patent No. 2,450,134.  September 28, 1948.

HUGH J. HAGEMEYER, Jr.

It is hereby certified that errors appear in the printed specification of the above numbered patent requiring correction as follows:

Column 4, line 53, for "lacetone" read *lactone*; column 7, line 50, for that portion of the formula reading "C—O" read *C=O*; column 10, line 5, for "0.13–3%" read *0.1–3%*; column 11, line 57, for that portion of the formula reading "R" read $R_4$; and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*